US012664733B2

(12) United States Patent
Cai et al.

(10) Patent No.: US 12,664,733 B2
(45) Date of Patent: Jun. 23, 2026

(54) SYSTEM AND METHOD FOR EXTENDED REALITY PROCESSING IN A LOCAL WIRELESS ENVIRONMENT WITH REDUCED LATENCY

(71) Applicant: T-Mobile Innovations LLC, Overland Park, KS (US)

(72) Inventors: Zheng Cai, Fairfax, VA (US); Zheng Fang, McLean, VA (US); Yu Wang, Fairfax, VA (US); David Zhijun Sun, Broadland, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 483 days.

(21) Appl. No.: 17/803,177

(22) Filed: Jun. 21, 2022

(65) Prior Publication Data

US 2024/0087238 A1    Mar. 14, 2024

(51) Int. Cl.
*G06T 19/00* (2011.01)
*H04W 64/00* (2009.01)

(52) U.S. Cl.
CPC .......... G06T 19/006 (2013.01); G06T 19/003 (2013.01); H04W 64/003 (2013.01)

(58) Field of Classification Search
CPC ............................. G06T 19/006; G06T 19/003
See application file for complete search history.

(56) References Cited

U.S. PATENT DOCUMENTS

| | | | |
|---|---|---|---|
| 10,203,762 B2 * | 2/2019 | Bradski ................ | H04N 21/414 |
| 11,112,856 B2 * | 9/2021 | Rouvinez .............. | G06T 19/006 |

| | | | |
|---|---|---|---|
| 2017/0004648 A1 * | 1/2017 | Li ......................... | G02B 27/017 |
| 2020/0104975 A1 * | 4/2020 | Banerjee ............... | A63F 13/428 |
| 2021/0125414 A1 * | 4/2021 | Berkebile ............... | G06F 3/017 |
| 2021/0383122 A1 * | 12/2021 | Jeong ................... | H04N 13/161 |
| 2022/0014724 A1 * | 1/2022 | Zink .................... | H04N 13/366 |

FOREIGN PATENT DOCUMENTS

| | | | | | |
|---|---|---|---|---|---|
| CN | 105188516 B | * | 12/2017 | ......... | G02B 27/0093 |
| CN | 107329260 B | * | 7/2021 | ............. | G02B 17/08 |

OTHER PUBLICATIONS

Mingze Chen, Artificial Neural Networks-Based Machine Learning for Wireless Networks: A Tutorial, 2019, IEEE (Year: 2019).*
CN_105188516 machine translation, 2017 (Year: 2017).*
CN_107329260 machine translation, 2021 (Year: 2021).*

* cited by examiner

*Primary Examiner* — Daniel F Hajnik
*Assistant Examiner* — Chris Alejandro Puntier
(74) *Attorney, Agent, or Firm* — Shook, Hardy & Bacon L.L.P.

(57) ABSTRACT

Aspects herein provide a system, media, and methods for a mobile edge computer that renders extended reality (XR) in support of a local user device, via a local network. The mobile edge computer can continue to provide updated XR renderings in near real-time when user position data remains within a particular viewing angle, without requesting updated content or rendering assistance from a remote application. When user position data is determined to be outside of the viewing angle, then the mobile edge computer may request additional content from the remote application.

20 Claims, 3 Drawing Sheets

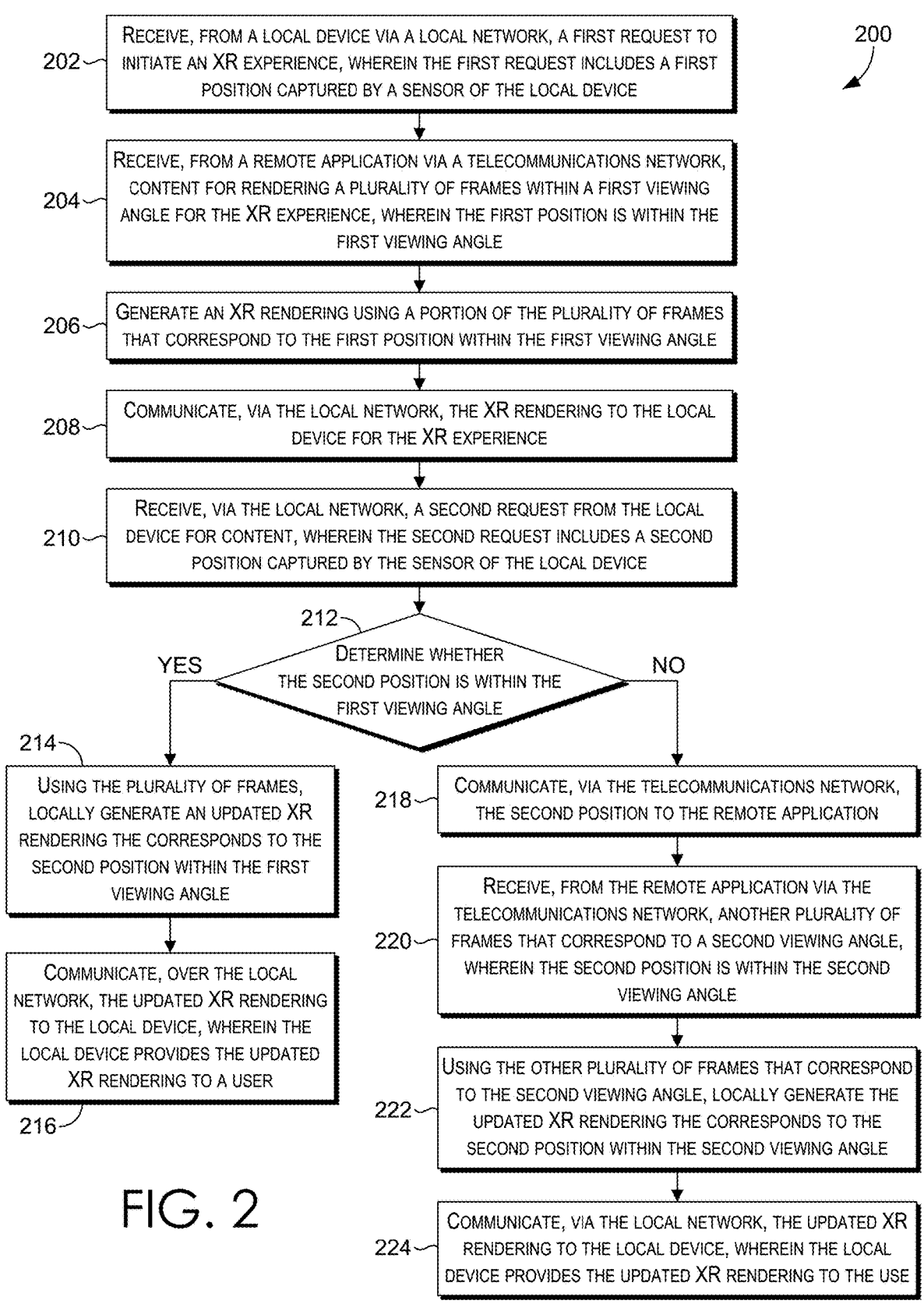

200

202 — RECEIVE, FROM A LOCAL DEVICE VIA A LOCAL NETWORK, A FIRST REQUEST TO INITIATE AN XR EXPERIENCE, WHEREIN THE FIRST REQUEST INCLUDES A FIRST POSITION CAPTURED BY A SENSOR OF THE LOCAL DEVICE

204 — RECEIVE, FROM A REMOTE APPLICATION VIA A TELECOMMUNICATIONS NETWORK, CONTENT FOR RENDERING A PLURALITY OF FRAMES WITHIN A FIRST VIEWING ANGLE FOR THE XR EXPERIENCE, WHEREIN THE FIRST POSITION IS WITHIN THE FIRST VIEWING ANGLE

206 — GENERATE AN XR RENDERING USING A PORTION OF THE PLURALITY OF FRAMES THAT CORRESPOND TO THE FIRST POSITION WITHIN THE FIRST VIEWING ANGLE

208 — COMMUNICATE, VIA THE LOCAL NETWORK, THE XR RENDERING TO THE LOCAL DEVICE FOR THE XR EXPERIENCE

210 — RECEIVE, VIA THE LOCAL NETWORK, A SECOND REQUEST FROM THE LOCAL DEVICE FOR CONTENT, WHEREIN THE SECOND REQUEST INCLUDES A SECOND POSITION CAPTURED BY THE SENSOR OF THE LOCAL DEVICE

212 — DETERMINE WHETHER THE SECOND POSITION IS WITHIN THE FIRST VIEWING ANGLE

YES

NO

214 — USING THE PLURALITY OF FRAMES, LOCALLY GENERATE AN UPDATED XR RENDERING THE CORRESPONDS TO THE SECOND POSITION WITHIN THE FIRST VIEWING ANGLE

216 — COMMUNICATE, OVER THE LOCAL NETWORK, THE UPDATED XR RENDERING TO THE LOCAL DEVICE, WHEREIN THE LOCAL DEVICE PROVIDES THE UPDATED XR RENDERING TO A USER

218 — COMMUNICATE, VIA THE TELECOMMUNICATIONS NETWORK, THE SECOND POSITION TO THE REMOTE APPLICATION

220 — RECEIVE, FROM THE REMOTE APPLICATION VIA THE TELECOMMUNICATIONS NETWORK, ANOTHER PLURALITY OF FRAMES THAT CORRESPOND TO A SECOND VIEWING ANGLE, WHEREIN THE SECOND POSITION IS WITHIN THE SECOND VIEWING ANGLE

222 — USING THE OTHER PLURALITY OF FRAMES THAT CORRESPOND TO THE SECOND VIEWING ANGLE, LOCALLY GENERATE THE UPDATED XR RENDERING THE CORRESPONDS TO THE SECOND POSITION WITHIN THE SECOND VIEWING ANGLE

224 — COMMUNICATE, VIA THE LOCAL NETWORK, THE UPDATED XR RENDERING TO THE LOCAL DEVICE, WHEREIN THE LOCAL DEVICE PROVIDES THE UPDATED XR RENDERING TO THE USE

FIG. 2

SYSTEM AND METHOD FOR EXTENDED REALITY PROCESSING IN A LOCAL WIRELESS ENVIRONMENT WITH REDUCED LATENCY

TECHNICAL BACKGROUND

The present disclosure generally relates to rendering extended reality experiences.

SUMMARY

A high-level overview of various aspects of the invention are provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

In brief and at a high level, this disclosure describes, among other things, methods, systems, and computer-readable media that reduce latency and bandwidth usage by facilitating extended reality rendering at a local edge device that supports an extended reality experience of one or more local user devices.

In one aspect, a method is provided. The method receives, via a local network, a first request from a local device to initiate an XR experience, wherein the first request includes a first position captured by a sensor of the local device. Content is then received, from a remote application via a telecommunications network, for rendering a plurality of frames within a first viewing angle for the XR experience, wherein the first position is within the first viewing angle. An XR rendering is generated using a portion of the plurality of frames that correspond to the first position within the first viewing angle. The XR rendering is communicated, via the local network, to the local device for the XR experience. Then, a second request for content is received from the local device via the local network, wherein the second request includes a second position captured by the sensor of the local device. It is determined whether the second position is within the first viewing angle. When the second position is determined to be within the first viewing angle, an updated XR rendering is locally generated that corresponds to the second position within the first viewing angle using the plurality of frames. The updated XR rendering is communicated to the local device via the local network, wherein the local device provides the updated XR rendering to a user.

In another aspect, one or more non-transitory computer-readable media are provided for storing instructions that, when executed via one or more processors, performs a computerized method. In aspects, via one or more processors, a first request is received from a local device via a local network to initiate an XR experience, wherein the first request includes a first position captured by a sensor of the local device. Content is then received, from a remote application via a telecommunications network, for rendering a plurality of frames within a first viewing angle for the XR experience, wherein the first position is within the first viewing angle. An XR rendering is generated using a portion of the plurality of frames that correspond to the first position within the first viewing angle. The XR rendering is communicated, via the local network, to the local device for the XR experience. In aspects, a second request for content is received from the local device via the local network, wherein the second request includes a second position captured by the sensor of the local device. It is determined whether the second position is within the first viewing angle. When the second position is determined to be within the first viewing angle, an updated XR rendering is locally generated that corresponds to the second position within the first viewing angle using the plurality of frames. The updated XR rendering is communicated via the local network to the local device, wherein the local device provides the updated XR rendering to a user.

In yet another aspect, a system is provided. The system includes a mobile edge device having a processor, a memory, and an antenna configured for communications with a telecommunications network and a local network. The mobile edge device receives, via a local network, a first request from a local device to initiate an XR experience, wherein the first request includes a first position captured by a sensor of the local device. The mobile edge device receives, from a remote application via the telecommunications network, content for rendering a plurality of frames within the first viewing angle for the XR experience, wherein the first position is within the first viewing angle. The mobile edge device generates an XR rendering using a portion of the plurality of frames that correspond to the first position within the first viewing angle. Then, the mobile edge device communicates, via the local network, the XR rendering to the local device for the XR experience. In aspects, the mobile edge device receives, via the local network, a second request from the local device for content, wherein the second request includes a second position captured by the sensor of the local device. The mobile edge device determines whether the second position is within the first viewing angle. When the mobile edge device determines the second position is within the first viewing angle, the mobile edge device uses the plurality of frames and locally generates an updated XR rendering that corresponds to the second position within the first viewing angle. The mobile edge device communicates, via the local network, the updated XR rendering to the local device, wherein the local device provides the updated XR rendering to the user.

BRIEF DESCRIPTION OF THE DRAWINGS

Aspects are described in detail below with reference to the attached drawings figures, wherein:

FIG. 2 depicts an example of a method in accordance with one or more embodiments.

DETAILED DESCRIPTION

Figure 1:
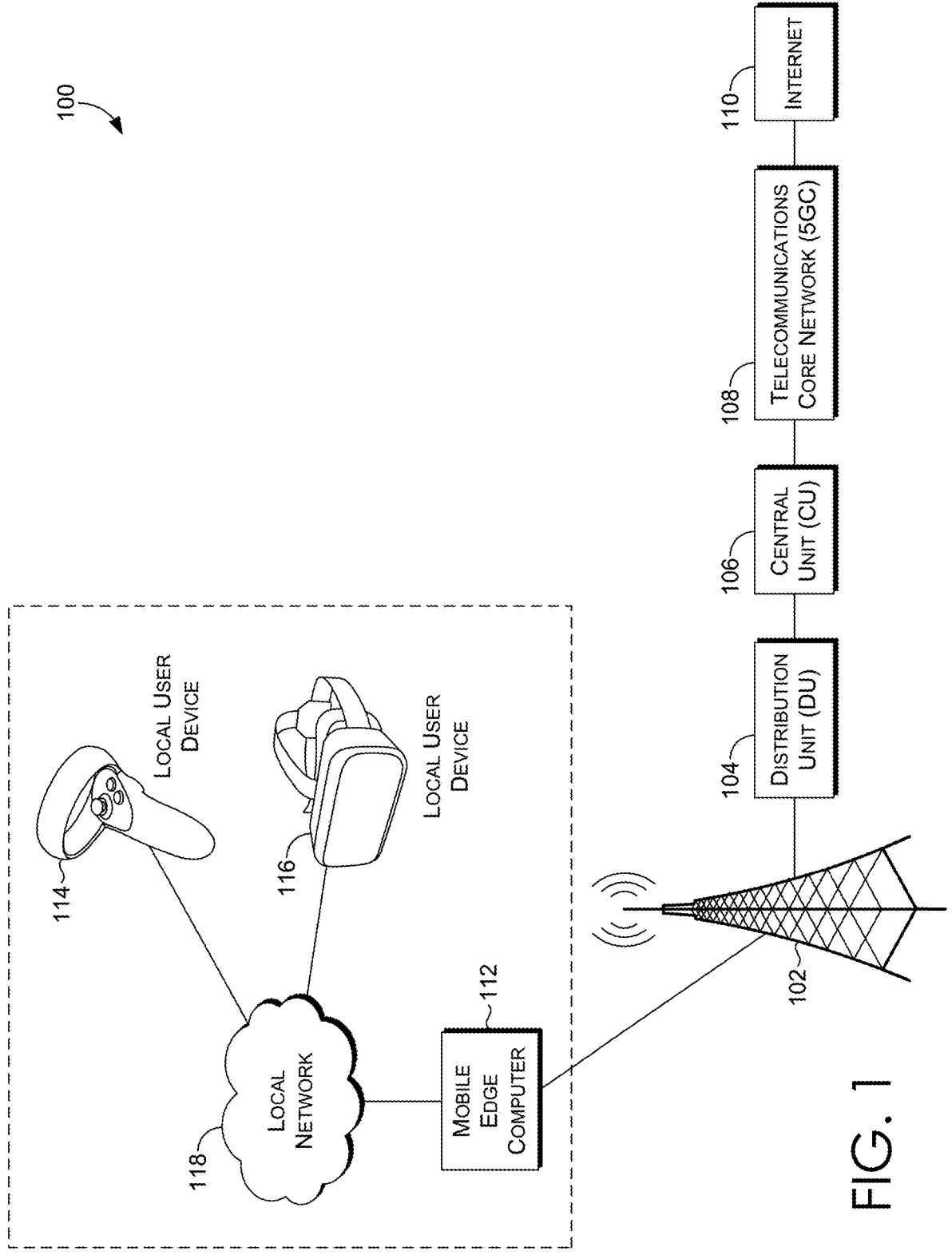
FIG. 1 depicts an example of a system in accordance with one or more embodiments.

The subject matter of the present invention is being described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Terms should not be interpreted as implying any particular order among or between various steps herein disclosed unless and except when the order of individual steps is explicitly described. As such, although the terms "step" and/or "block" may be used herein to connote different elements of the system and/or methods, the terms should not be interpreted as implying any particular order and/or dependencies among or between various components and/or steps herein disclosed unless and except when the order of individual steps is explicitly described. The present disclosure will now be described more fully herein with reference to the accompanying drawings, which may not be drawn to scale and which are not to be construed as limiting. Indeed, the present invention can be embodied in many different forms and should not be construed as limited to the embodiments set forth herein.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:

3G Third-Generation Wireless Access Technology
4G Fourth-Generation Wireless Access Technology
5G Fifth-Generation Wireless Access Technology
5GC Fifth-Generation Wireless Access Technology Core Network
CD-ROM Compact Disk Read Only Memory
CDMA Code Division Multiple Access
CU Central unit
DU Distribution unit
GIS Geographic/Geographical/Geospatial Information System
GPRS General Packet Radio Service
GSM Global System for Mobile Communications
iDEN Integrated Digital Enhanced Network
DVD Digital Versatile Disc
EEPROM Electrically Erasable Programmable Read-Only Memory
FD-MIMO Full Dimension Multiple-Input Multiple-Output
IOT Internet of Things
IIOT Industry Internet of Things
LED Light Emitting Diode
LTE Long Term Evolution
MEC Mobile Far Edge Computer
MD Mobile Device
MIMO Multiple-Input Multiple-Output
mMIMO Massive Multiple-Input Multiple-Output
MMU Massive Multiple-Input Multiple-Output Unit
mmWave Millimeter Wave
NEXRAD Next-Generation Radar
NR New Radio
PC Personal Computer
PCS Personal Communications Service
PDA Personal Digital Assistant
PLMN Public Land Mobile Network
RAN Radio Access Network
RAM Random Access Memory
RF Radio-Frequency
ROM Read-Only Memory
RRU Remote Radio Unit
RU Radio Unit
SON Self-Organizing Networks
TDMA Time Division Multiple Access
TXRU Transceiver (or Transceiver Unit)
UE User Equipment
UMTS Universal Mobile Telecommunications System
UTRAN UMTS Radio Access Network
E-UTRAN Evolved Universal Mobile Telecommunications System WCD Wireless Communication Device (interchangeable with UE)
WLAN Wireless Local Area Network
XR Extended Reality Further, various technical terms are used throughout this description. An illustrative resource that fleshes out various aspects of these terms can be found in Newton's Telecom Dictionary, 25th Edition (2009).

Embodiments herein may be embodied as, among other things: a method, system, or set of instructions embodied on one or more computer-readable media. Computer-readable media include both volatile and nonvolatile media, removable and non-removable media, and contemplate media readable by a database, a switch, and various other network devices. Computer-readable media includes media implemented in any way for storing information. Examples of stored information include computer-useable instructions, data structures, program modules, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer program product that includes computer-useable or computer-executable instructions embodied on one or more computer-readable media.

"Computer-readable media" can be any available media and may include volatile and nonvolatile media, as well as removable and non-removable media. By way of example, and not limitation, computer-readable media may include computer storage media and communication media.

"Computer storage media" may include, without limitation, volatile and non-volatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the computing device 300 shown in FIG. 3.

"Communication media" may include, without limitation, computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above may also be included within the scope of computer-readable media.

"Network" refers to a network comprised of wireless and wired components that provide wireless communications service coverage to one or more UE. For example, the network may include one or more, or a plurality of, wireless networks, hardwired networks, telecommunication networks, peer-to-peer networks, distributed networks, and/or any combination thereof. The network may comprise one or more base stations, one or more cell sites (i.e., managed by a base station), one or more cell towers (i.e., having an antenna) associated with each base station or cell site, a gateway, a backhaul server that connects two or more base stations, a database, a power supply, sensors, and other components not discussed herein, in various embodiments. Examples of a network include a telecommunications network (e.g., 3G, 4G, 5G, CDMA, CDMA 1XA, GPRS, EVDO, TDMA, GSM, LTE, and/or LTE Advanced). Additional examples of a network include a wide area network (WAN), a local area network (LAN), a metropolitan area network (MAN), a wide area local network (WLAN), a personal area network (PAN), a campus-wide network (CAN), a storage area network (SAN), a virtual private network (VPN), an enterprise private network (EPN), a home area network (HAN), a Wi-Fi network, a Worldwide Interoperability for Microwave Access (WiMax) network, and/or an ad-hoc (mesh) network. The network may include or may communicate with a physical location component for determining a geographic location of an item, package, parcel, personnel, vehicle, end-point location, etc., by leveraging, for example, a Global Positioning System (GPS), Globalnaya Navigazionnaya Sputnikovaya Sistema (GLO-NASS), BeiDou Navigation Satellite System (BDS), Global Navigation Satellite System (GNSS or "Galileo"), an indoor position system (IPS), or other positioning systems that leverage non-GPS signals or networks (e.g., signals of opportunity (SOP)).

"Base station" and "cell site" may be used interchangeably herein to refer to a defined wireless communications coverage area (i.e., a geographic area) serviced by a base station. It will be understood that one base station may control one cell site or, alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

"Access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO) as discussed hereinafter. Access point refers to a device with complex software that is specifically configured to provide one or more user devices with a connection and/or access to a wireless network using, for example, an antenna, an antenna array, and/or one or more antenna elements. Examples of an access point include a cell tower, a cell site, a base station, a NodeB, an eNodeB, a gNodeB, a macro cell, a micro cell, a femtocell, a picocell, and/or a computing device capable of acting as a wireless "hotspot." The terms "access point," "cell site," "base station," and "cell tower" are used interchangeably for simplicity and thus the terms should not be construed as limiting with regard to one another unless expressly designated as such in this Detailed Description. Examples of a cell site include macro cells such as a cell tower controlled by a gNodeB, as well as small cells, such as a femto cell or pico cell. Accordingly, the scale and coverage area of an access point is not limited to the examples discussed, and any size and shape of coverage area is contemplated to be within the scope of the invention. Because a cell tower and a base station controlling the cell tower may be remote from one another, or alternatively may be localized to each other, the term access point is not intended to be so limited as to require a cell tower and/or antenna. Generally, an access point, as discussed herein, is intended to refer to any device, whether local or remote to a physical location of a cell tower and/or antenna, having complex software that is specifically configured to provide one or more user devices with a connection and/or access to a wireless network.

"Mobile edge computer" refers to a computing device that connects to a local network, for example, a local server device that is physically placed in a residential environment of a user and that is connected to a residential wireless network. In some aspects, the mobile edge computer is configured to generate the local wireless network (e.g., WiFi) itself and to connect that local wireless network to the Internet through a long-range network (e.g., 5G via a base station) provided by a service provider (e.g., T-Mobile®). Thus, the mobile edge computer concurrently generates the local network and connects to a remote network, such as a telecommunications network via a base station. Examples of a mobile edge computer can include a router or a server. The mobile edge computer is distinct from user equipment, such as a smart phone or personal laptop computer, in that the mobile edge computer is a device having significantly more processing capacity and memory resources that support high-level processing needs.

"User equipment," "UE," "mobile device," and "wireless communication device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smartphone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

"Extended Reality" (XR) refers to audio, visual, and/or physically experiential environments that are created as either wholly or partially digital. Examples of XR include augmented reality (AG), virtual reality (VR), and mixed reality (MR). XR experiences may be deployed around, within, or involving the Metaverse, in some aspects. In a similar fashion, an "XR experience" refers to a user-consumable experience of an extended reality via one or more user interfaces.

"Frames" refers to one or more frames of digital content for display or other user interface presentation using a particular sequence, which can be provided using a specified framed rate (frequency), for example, to generate a seamless and immersive user experience. In one example, a frame rate of 90 frames per second may be used to support a virtual reality experience.

The terms "radio," "controller," "antenna," and "antenna array" are used interchangeably to refer to one or more software and hardware components that facilitate sending and receiving wireless radio-frequency signals, for example, based on instructions from a base station. A radio may be used to initiate and generate information that is then sent out through the antenna array, for example, where the radio and antenna array may be connected by one or more physical paths. Generally, an antenna array comprises a plurality of individual antenna elements. The antennas discussed herein may be dipole antennas, having a length, for example, of ¼, ½, 1, or 1½ wavelength. The antennas may be monopole, loop, parabolic, traveling-wave, aperture, yagi-uda, conical spiral, helical, conical, radomes, horn, and/or apertures, or any combination thereof. The antennas may be capable of sending and receiving transmission via FD-MIMO, Massive MIMO, 3G, 4G, 5G, and/or 802.11 protocols and techniques.

Additionally, it will be understood that sequential or relative terms such as "first," "second," and "third" are used herein for the purposes of clarity in distinguishing between elements or features, but the terms are not used herein to import, imply, or otherwise limit the relevance, importance, quantity, technological functions, physical or temporal sequence, physical or temporal order, and/or operations of any element or feature unless specifically and explicitly stated as such.

Beginning with FIG. 1, it provides a system 100. The system 100 includes a radio unit 102, a distribution unit 104, a central unit 106, a telecommunications core network 108 that interfaces with and connects the system 100 and its components to the internet 110. The system further includes a mobile edge computer 112 that communicates with the telecommunications core network 108 using the radio unit 102, and that communicates with one or more local user devices 114 and 116 using a local network 118.

The radio unit 102 includes software and hardware that convert radio signals received via an antenna into digital signals, which are then communicated to the distribution unit 104. The radio unit 102 can include, for example, one or more radio elements of an antenna or antenna array for transmission and receipt of radio frequency signals, for example, where the antenna is associated with or corresponds to a cell tower or base station. The radio unit 102 can include, for example, converters, power amplifiers, power supplies, bandpass filters, and other components. In one aspect, the radio unit 102 includes Synchronization and Fronthaul Transport components, Lower Physical Layer Baseband Processing components, Digital Front End (DFE) components, and/or RF Front End (RF FE) components, for example, to operate and function with an open RAN (O-RAN).

The distribution unit 104 is associated with and/or supports a physical layer associated with a plurality of physical resource blocks, in aspects. Additionally, the distribution unit 104 can be associated with and/or support a Media Access Control (MAC) layer, a Radio Link Control (RLC) layer, and others. The central unit 106 provides and/or supports one or more layers in the protocol stack that are arranged relative to those other layers associated with the distribution unit 104. The central unit 106 can be associated with and/or support a Packet Data Convergence Protocol (PDCP) layer, a Service Data Adaptation Protocol (SDAP) layer, a Radio Resource Control (RRC) layer, and others, for example.

The mobile edge computer 112 is an infrastructure device such as a wireless home router device comprised of one or more computing processors, storage, memory, graphic processing units (GPU), artificial intelligence processing units hardware, application platform architecture, server application software, and/or the like. The mobile edge computer 112 can also include specialty processors and applications such as, for example, NVidia® GPU, VMware® cloud computing application(s), Mawari cloud streaming application(s), Unreal Engine 4 Server application(s), 20×HiREs Organs, and the like, or any combination thereof. The mobile edge computer 112 may be a router or a server, in some aspects. The mobile edge computer 112 communicates with the telecommunications core network 108 using the radio unit 102, and communicates with one or more local user devices 114 and 116 using a local network 118. As such, the mobile edge computer 112 is capable of facilitating concurrent multi-network connections, concurrent multi-device connections, and concurrent long-range, short-range, and mid-range wireless communications. Accordingly, the mobile edge computer 112 can include a processor, a memory, and an antenna configured for communications with a telecommunications network and a local network.

The one or more local user devices 114 and 116 include one or more sensors, one or more processors, memory, and one or more output components that facilitate an XR experience for a user by providing or presenting audio, visual, and/or haptic experiences for a user. As such, the one or more local user devices 114 and 116 may include and/or run a software application for facilitating an XR experience. Examples of XR experience capable devices include Oculus® glasses-types devices, handset-type devices, headset-type devices, haptic feedback devices, projection-capable devices, smart phones, mat-type devices, and more. Examples of the one or more sensors can include an optical camera, an infrared camera, a motion detection sensor, a motion tracking sensor, a proximity sensor, a Soli® sensor/microchip, a location determining or detecting sensor, a gyroscope, a magnetometer, an Ultra Wideband (U1) chip, a pressure sensor, an accelerometer, a biometric sensor, a light measurement sensor, and more, or any combination thereof. The one or more local user devices 114 and 116 may communicate in real-time or near real-time with one or more external devices that provide location, motion, visual, proximity, or other data, for example, captured in real-time or near real-time by the one or more external devices using one or more sensors, to the one or more local user devices 114 and 116.

The local network 118 includes a short-range wireless network that is at least partially generated by the mobile edge computer 112. Examples of a local network 118 include a Wi-Fi network, a WLAN, a HAN, and a mesh network. The one or more local user devices 114 and 116 can connect to the local network 118 using authentication techniques that may be enforced by the mobile edge computer 112.

In aspects, the system 100 utilizes one or more processors and the components discussed above to perform specific operations and functions as further discussed hereinafter. For example, the mobile edge computer 112 includes one or more processors to perform the methods discussed herein after. In aspects, the mobile edge computer 112 receives, via the local network 118, a first request from a local device to initiate an XR experience, wherein the first request includes a first position captured by a sensor of the local device. The first position is encoded as data specifying a user's physical position as six degrees of freedom within a three-dimensional space, in aspects. The six degrees of freedom include one or more of a rotational movement or a translational movement, such that, for example, the user's physical position may be encoded as three degrees of rotational movement or positioning, and three degrees of translational movement or positioning. The first request can be provided to a remote application, either directly or indirectly via the mobile edge computer 112, in various aspects, with or without modifications. Additionally or alternatively, in response to the first request, the mobile edge computer 112 can locally initiate the XR experience while also requesting content from a remote application XR server, as further discussed herein.

The mobile edge computer 112 receives, from a remote application via the telecommunications network, content for rendering a plurality of frames within the first viewing angle for the XR experience, wherein the first position is within the first viewing angle. For example, the first viewing angle may include frames that can be used to generate an extended reality view angle of 120 degrees, 105 degrees, or 180 degrees, for example. The remote application may correspond to a software application for supporting an XR experience that is to be provided or experienced via the one or more local user devices 114 and 116, such as a virtual reality headset. The mobile edge computer 112 generates an XR rendering using a portion of the plurality of one or more local user devices 114 and 116 frames that correspond to the first position within the first viewing angle, in aspects. The mobile edge computer 112 then communicates, via the local network, the XR rendering to one or more local user devices 114 and 116 for the XR experience. As used herein, "rendering" refers specific to highly specialized computer processing action wherein data is transformed and generated into consumable (e.g., visual, audio) experiences, for example, by using content data to generate two- or three-dimensional images via computer modeling.

In this manner, a user can initiate and run a software application for providing an XR experience at the one or more local user devices 114 and 116, and the user's position is captured by one or more sensors associated with the one or more local user devices 114 and 116. The user's position data is provided to the mobile edge computer 112 via the local network 118. The mobile edge computer 112, in turn, provides the user position data to the remote application accessible via the telecommunications core network 108 and radio unit 102. The remote application identifies, generates, and provides, based on the user's position data, a plurality of frames of content for XR that are specific to and correspond to the viewing angle for the user's position data, back to the mobile edge computer 112. The mobile edge computer 112 performs the rendering of the content for the viewing angle within the frames and communicates the XR rendering to the one or more local user devices 114 and 116 so that the user experiences XR. For example, the XR rendering is generated using the portion of frames in the plurality of frames that correspond to the user position specified in the six degrees of freedom within the three-dimensional space for the first position. The rendering is performed by the mobile edge computer 112 whereas the display of the XR rendering is performed by the one or more local user devices 114 and 116. Accordingly, the user can experience a seamless XR experience, for example, in a residential environment though other environments are within the scope of this disclosure.

Continuing with the same XR session for the user, the mobile edge computer 112 receives, via the local network, a second request from the local device for content, wherein the second request includes a second position captured by the sensor of the one or more local user devices 114 and 116. The second position is encoded as data specifying a user's physical position as six degrees of freedom within a three-dimensional space, in aspects. The six degrees of freedom include one or more of a rotational movement or a translational movement, such that, for example, the user's physical position may be encoded as three degrees of rotational movement or positioning, and three degrees of translational movement or positioning. The mobile edge computer 112 then determines whether the second position is within (remains within) the first viewing angle. For example, the second position data may be a position or a degree that is within the first viewing angle of 120 degrees. When the mobile edge device determines the second position is within the first viewing angle, the mobile edge computer 112 uses the plurality of frames (as previously received from the remote application and without making any further requests to the remote application) and locally generates an updated XR rendering the corresponds to the second position within the first viewing angle. The mobile edge computer 112 then communicates, via the local network, the updated XR rendering to the one or more local user devices 114 and 116, wherein the one or more local user devices 114 and 116 provide the updated XR rendering to the user.

However, when mobile edge computer 112 determines the second position is outside of the first viewing angle, the mobile edge computer 112 communicates, via the telecommunications network, the second position to a remote application. For example, the second position data may be a position or a degree that is outside of the first viewing angle of 120 degrees. The mobile edge computer 112 lacks those frames outside of the first viewing angle and seeks to obtain, in this regard, from the remote application. The mobile edge computer 112 receives, from the remote application via the telecommunications network, another plurality of frames that correspond to a second viewing angle, wherein the second position is within the second viewing angle. The mobile edge computer 112 uses the other plurality of frames that correspond to a second viewing angle to locally generate an updated XR rendering that corresponds to the second position within the second viewing angle frames. For example, the mobile edge computer 112 uses the other plurality of frames (a different set of frames) that correspond to the user's position specified in the six degrees of freedom within the three-dimensional space for the second position. The mobile edge computer 112 then communicates, via the local network, the updated XR rendering to the one or more local user devices 114 and 116, wherein the one or more local user devices 114 and 116 provide the updated XR rendering to the user.

Continuing with the same XR session for the user, the mobile edge computer 112 receives, via the local network, a third request from the one or more local user devices 114 and 116 for content, wherein the third request includes a third position captured by the sensor of the one or more local user devices 114 and 116 and encoded as data, as described above. The mobile edge computer 112 determines whether the third position is within the first viewing angle, as previously discussed. When the mobile edge device determines the third position is within the first viewing angle, the mobile edge computer 112 uses the plurality of frames (as previously received from the remote application and without making any further requests to the remote application) and locally generates another updated XR rendering the corresponds to the third position within the first viewing angle. The mobile edge computer 112 communicates, via the local network, the other updated XR rendering to the one or more local user devices 114 and 116, wherein the one or more local user devices 114 and 116 provide the other updated XR rendering to the user.

11 12

Accordingly, each time the mobile edge computer 112 receives updated user positioning data in near real-time, the mobile edge computer 112 can provide updated XR rendering in near real-time, with minimal latency introduction, so that the one or more local devices can provide an uninterrupted and seamless XR experience that is responsive to real-time changes in the user's position, as captured by one or more sensors of the one or more local user devices 114 and 116. When updated user position information remains within a viewing angle for which the mobile edge computer 112 has already obtained (and at least transiently stored, or cached for the session) frames, the mobile edge computer 112 can immediately provide an updated XR rendering to the one or more local user devices 114 and 116 without requesting any data from the remote application. As such, the mobile edge computer 112 sends requests to the remote application only when, in such aspects, the updated user position information remains outside of a viewing angle for which the mobile edge computer 112 has already obtained the frames. In those instances, the mobile edge computer 112 requests content from the remote application, which provides XR content as another plurality or set of frames. In this manner, the mobile edge computer 112 is able to provide XR renderings to the one or more local user devices 114 and 116 via the local network 118 with a reduction in requests to the remote application, thereby reducing bandwidth usage in the telecommunications core network 108 and reducing latency introduction. Accordingly, this technological configuration for splitting rendering between the mobile edge computer 112 and the remote application provides an improvement over other technologies, as this technological configuration reduces latency and bandwidth usage.

Having described the system 100 and components thereof, it will be understood by those of ordinary skill in the art that system 100 is but one example of a suitable system and is not intended to limit the scope of use or functionality of the present invention. Similarly, system 100 should not be interpreted as imputing any dependency and/or any requirements with regard to each component and combination(s) of components illustrated in FIG. 1. It will be appreciated by those of ordinary skill in the art that the location of components illustrated in FIG. 1 is an example, as other methods, hardware, software, components, and devices for establishing communication links between the components shown in FIG. 1, may be utilized in implementations of the present invention. It will be understood to those of ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components are represented in FIG. 1 as singular components, it will be appreciated that some embodiments may include a plurality of devices and/or components such that FIG. 1 should not be considered as limiting the number of a device or component.

Turning to FIG. 2, a method 200 is provided for establishing a provenance of a media file. In some embodiments, the method 200 can be a computer-implemented method. In one embodiment, one or more non-transitory computer-readable storage media having computer-readable instructions or computer-readable program code portions embodied thereon, for execution via one or more processors, can be used to implement and/or perform the method 200. For example, computer-readable instructions or computer-readable program code portions can specify the performance of the method 200, can specify a sequence of steps of the method 200, and/or can identify particular component(s) of software and/or hardware for performing one or more of the steps of the method 200, in embodiments. As discussed below, the method 200 can be performed using software, hardware, component(s), and/or device(s) depicted in the example of FIG. 1. For example, the method 200 may be performed by a mobile edge device having a processor, a memory, and an antenna configured for communications with the telecommunications network and the local network, as discussed in FIG. 1.

At block 202, a first request is received, from a local device via a local network, to initiate an XR experience, wherein the first request includes a first position captured by a sensor of the local device. The first position comprises data specifying a user position in six degrees of freedom within a three-dimensional space, and wherein the six degrees of freedom include one or more of a rotational movement or a translational movement.

At block 204, content for rendering a plurality of frames within a first viewing angle for the XR experience is received from a remote application via a telecommunications network, wherein the first position is within the first viewing angle. At block 206, an XR rendering is generated using a portion of the plurality of frames that correspond to the first position within the first viewing angle. In aspects, the XR rendering is generated using the portion of frames in the plurality of frames that correspond to the user position specified in the six degrees of freedom within the three-dimensional space for the first position. At block 208, the XR rendering is communicating to the local device for the XR experience via the local network. At block 210, a second request for content is received from the local device via the local network, wherein the second request includes a second position captured by the sensor of the local device. The second position comprises data specifying a user position in six degrees of freedom within a three-dimensional space, and wherein the six degrees of freedom include one or more of a rotational movement or a translational movement. Generally, the first and second position are different such that the second position indicates that the user has moved, made a motion, or changed a physical position in three dimensional space relative to the first position.

At block 212, it is determined whether the second position is within the first viewing angle. When the second position is determined to be within the first viewing angle, an updated XR rendering that corresponds to the second position within the first viewing angle is locally generated using the plurality of frames, shown at block 214. Then, at block 216, the updated XR rendering is communicated to the local device via the local network, wherein the local device provides the updated XR rendering to a user.

However, when the second position is determined to be outside of the first viewing angle, the second position is communicated to the remote application via the telecommunications network, shown at block 218. At block 220, another plurality of frames that correspond to a second viewing angle is received from the remote application via the telecommunications network, wherein the second position is within the second viewing angle. At block 222, an updated XR rendering that corresponds to the second position within the second viewing angle is locally generated using the other plurality of frames that correspond to the second viewing angle. In such aspects, the updated XR rendering is generated using the other plurality of frames that correspond to the user position specified in the six degrees of freedom within the three-dimensional space for the second position within the second viewing angle. Then, at block 224, the updated XR rendering is communicated to the local device via the local network, wherein the local device provides the updated XR rendering to the user.

Additionally or alternatively, whether prior to or subsequent to receiving the second request, a third request may be received from the local device for content, wherein the third request includes a third position captured by the sensor of the local device. In such aspects, it is determined whether the third position is within the first viewing angle or is within the second view angle, for which content/frames have been retrieved prior. When the third position is determined to be within the first viewing angle, another updated XR rendering that corresponds to the third position within the first viewing angle is locally generated using the plurality of frames previously received (e.g., based on the first viewing angle). When the third position is determined to be within the second viewing angle, another updated XR rendering that corresponds to the third position within the second viewing angle is locally generated using the other plurality of frames previously received (e.g., based on the second viewing angle). In either aspect, this now updated XR rendering is communicated to the local device via the local network, wherein the local device provides the other updated XR rendering to the user. However, when the third position is determined to be outside the first viewing angle and outside the second viewing angle, in such an aspect, additional content/frames are requested and received from the remote application, wherein the additional content/frames correspond to another viewing angle that includes the third position. In this manner, yet another updated XR rendering is locally generated using the additional content/frames and communicated to the local devices, as previously described.

Accordingly, the method discussed herein is iteratively performed for each instance when new or updated position data is received for the XR experience. As the new or updated position data remains within a viewing angle for which the mobile computer device has previously received content/frames, the mobile computer device can locally handle XR rendering on the local network, without contacting the remote application for new content/frames. This generally reduces the quantity and frequency of such requests, thereby reducing bandwidth usage via the telecommunications network, and further reducing latency introduction as a greater portion of XR rendering is locally processed by the mobile computer device and not the remote application.

Figure 3:
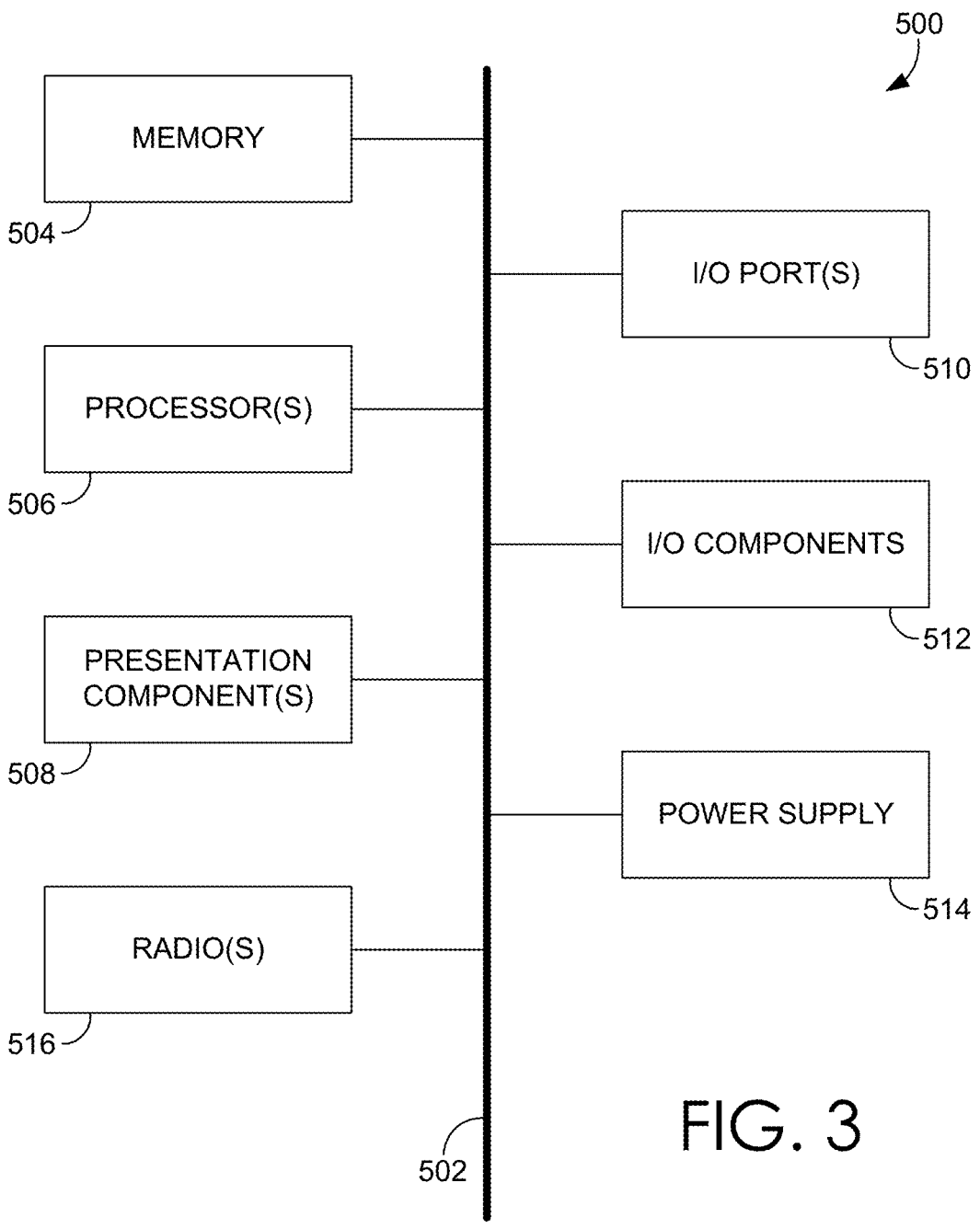
FIG. 3 illustrates an example computing device suitable for use in implementations of the present disclosure.

Turning now to FIG. 3, a diagram is depicted of an example computing device 300 suitable for use in implementations of the present disclosure. Computing device 300 is but one example of a suitable computing environment and is not intended to suggest any limitation as to the scope of use or functionality of the invention. Neither should computing device 300 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 3, computing device 300 includes bus 302 that directly or indirectly couples the following devices: memory 304, one or more processors 306, one or more presentation components 308, input/output (I/O) ports 310, I/O components 312, and power supply 314. Bus 302 represents what may be one or more busses (such as an address bus, data bus, or combination thereof). Although the devices of FIG. 3 are shown with lines for the sake of clarity, in reality, delineating various components is not so clear, and metaphorically, the lines would more accurately be grey and fuzzy. For example, one may consider a presentation component such as a display device to be one of I/O components 312. Also, processors, such as one or more processors 306, have memory. Distinction is not made between such categories as "workstation," "server," "laptop," "handheld device," etc., as all are contemplated within the scope of FIG. 3 and refer to "computer" or "computing device."

Computing device 300 typically includes a variety of computer-readable media. Computer-readable media can be any available media that can be accessed by computing device 300 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 304 includes computer-storage media in the form of volatile and/or nonvolatile memory. Memory 304 may be removable, non-removable, or a combination thereof. Examples of memory include solid-state memory, hard drives, optical-disc drives, etc. Computing device 300 includes one or more processors 306 that read data from various entities such as bus 302, memory 304 or I/O components 312. One or more presentation components 308 present data indications to a person or other device. Examples of one or more presentation components 308 include a display device, speaker, printing component, vibrating component, etc. I/O ports 310 allow computing device 300 to be logically coupled to other devices, including I/O components 312, some of which may be built in computing device 300. Examples of I/O components 312 include a microphone, joystick, game pad, satellite dish, scanner, printer, wireless device, etc.

Radio 316 represents a radio that facilitates communication with a wireless telecommunications network. Illustrative wireless telecommunications technologies include CDMA, GPRS, TDMA, GSM, and the like. Radio 316 might additionally or alternatively facilitate other types of wireless communications including Wi-Fi, WiMAX, LTE, or other VoIP communications. As can be appreciated, in various embodiments, radio 316 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A computerized method comprising:

receiving, via a local network that is generated by a mobile edge computing device, a first request from a local device to initiate an XR experience, wherein the first request includes a first position captured by a sensor of the local device;

receiving, from a remote application via a telecommunications network, content for rendering a plurality of frames within a first viewing angle for the XR experience, wherein the first position is within the first viewing angle;

generating an XR rendering comprising a first set of frames, using a first portion of the content that corresponds to the first position within the first viewing angle;

communicating, via the local network, the XR rendering to the local device for the XR experience;

receiving, via the local network, a second request from the local device for content, wherein the second request includes a second position captured by the sensor of the local device;

determining whether the second position is within the first viewing angle;

when the second position is determined to be within the first viewing angle:

without receiving additional content from the telecommunication network, using a second portion of the content previously received from the telecommunication network, generating, by the local network, an updated XR rendering comprising a second set of frames that corresponds to the second position within the first viewing angle; and communicating via the local network, the updated XR rendering to the local device, wherein the local device provides the updated XR rendering to a user.

2. The method of claim 1, wherein when the second position is determined to be outside of the first viewing angle:

communicate, via the telecommunications network, the second position to the remote application;

receive, from the remote application via the telecommunications network, another plurality of frames that correspond to a second viewing angle, wherein the second position is within the second viewing angle;

using the other plurality of frames that correspond to the second viewing angle, locally generate the updated XR rendering that corresponds to the second position within the second viewing angle; and communicate, via the local network, the updated XR rendering to the local device, wherein the local device provides the updated XR rendering to the user.

3. The method of claim 1, further comprising:

receive, via the local network, a third request from the local device for content, wherein the third request includes a third position captured by the sensor of the local device;

determine whether the third position is within the first viewing angle;

when the third position is determined to be within the first viewing angle:

using the plurality of frames, locally generate another updated XR rendering that corresponds to the third position within the first viewing angle; and communicate, via the local network, the other updated XR rendering to the local device, wherein the local device provides the other updated XR rendering to the user.

4. The method of claim 1, wherein the first position and the second position each comprise data specifying a user position in six degrees of freedom within a three-dimensional space, and wherein the six degrees of freedom include one or more of a rotational movement or a translational movement.

5. The method of claim 4, wherein the XR rendering is generated using the portion of frames in the plurality of frames that correspond to the user position specified in the six degrees of freedom within the three-dimensional space for the first position.

6. The method of claim 4, wherein the updated XR rendering is generated using the other plurality of frames that correspond to the user position specified in the six degrees of freedom within the three-dimensional space for the second position.

7. The method of claim 1, wherein the method is performed by a mobile edge device having a processor, a memory, and an antenna configured for communications with the telecommunications network and the local network.

8. One or more non-transitory computer-readable media storing instructions that when executed via one or more processors performs a computerized method, the media comprising:

via one or more processors:

receive, via a local network that is generated by a mobile edge computing device, a first request from a local device to initiate an XR experience, wherein the first request includes a first position captured by a sensor of the local device;

receive, from a remote application via a telecommunications network, content for rendering a plurality of frames within a first viewing angle for the XR experience, wherein the first position is within the first viewing angle;

generate an XR rendering comprising a first set of frames using a first portion of the content that corresponds to the first position within the first viewing angle;

communicate, via the local network, the XR rendering to the local device for the XR experience;

receive, via the local network, a second request from the local device for content, wherein the second request includes a second position captured by the sensor of the local device;

determine whether the second position is within the first viewing angle;

when the second position is determined to be within the first viewing angle:

without receiving additional content from the telecommunication network, using a second portion of the content previously received from the telecommunication network, generating, by the local network, an updated XR rendering comprising a second set of frames that corresponds to the second position within the first viewing angle; and communicate, via the local network, the updated XR rendering to the local device, wherein the local device provides the updated XR rendering to a user.

9. The media of claim 8, wherein when the second position is determined to be outside of the first viewing angle:

communicate, via the telecommunications network, the second position to the remote application;

receive, from the remote application via the telecommunications network, another plurality of frames that correspond to a second viewing angle, wherein the second position is within the second viewing angle;

using the other plurality of frames that correspond to the second viewing angle, locally generate the updated XR rendering the corresponds to the second position within the second viewing angle; and communicate, via the local network, the updated XR rendering to the local device, wherein the local device provides the updated XR rendering to the user.

10. The media of claim 8, further comprising:

receive, via the local network, a third request from the local device for content, wherein the third request includes a third position captured by the sensor of the local device;

determine whether the third position is within the first viewing angle;

when the third position is determined to be within the first viewing angle:

using the plurality of frames, locally generate another updated XR rendering the corresponds to the third position within the first viewing angle; and communicate, via the local network, the other updated XR rendering to the local device, wherein the local device provides the other updated XR rendering to the user.

11. The media of claim 8, wherein the first position and the second position each comprise data specifying a user position in six degrees of freedom within a three-dimensional space, and wherein the six degrees of freedom include one or more of a rotational movement or a translational movement.

12. The media of claim 11, wherein the XR rendering is generated using the portion of frames in the plurality of frames that correspond to the user position specified in the six degrees of freedom within the three-dimensional space for the first position.

13. The media of claim 11, wherein the updated XR rendering is generated using the other plurality of frames that correspond to the user position specified in the six degrees of freedom within the three-dimensional space for the second position.

14. The media of claim 11, wherein the second position is determined to be within the first viewing angle when the data encoding the user position in the six degrees of freedom within the three-dimensional space further specifies that the user position is located within one or more of the plurality of frames within the first viewing angle.

15. A system comprising:

a mobile edge device having a processor, a memory, an antenna configured for communications with a telecommunications network and a local network, wherein the mobile edge device:

receives, via the local network that is generate by the mobile edge computing device, a first request from a local device to initiate an XR experience, wherein the first request includes a first position captured by a sensor of the local device;

receives, from a remote application via the telecommunications network, content for rendering a plurality of frames within a first viewing angle for the XR experience, wherein the first position is within the first viewing angle;

generates an XR rendering comprising a first set of frames using a first portion of the content that corresponds to the first position within the first viewing angle;

communicates, via the local network, the XR rendering to the local device for the XR experience;

receives, via the local network, a second request from the local device for content, wherein the second request includes a second position captured by the sensor of the local device;

determines whether the second position is within the first viewing angle;

when the mobile edge device determines the second position is within the first viewing angle:

without receiving additional content from the telecommunication network, using a second portion of the content previously received from the telecommunication network, generates, by the local network, an updated XR rendering comprising a second set of frames that corresponds to the second position within the first viewing angle; and communicates, via the local network, the updated XR rendering to the local device, wherein the local device provides the updated XR rendering to a user.

16. The system of claim 15, wherein the mobile edge device:

when the mobile edge device determines the second position is outside of the first viewing angle:

communicates, via the telecommunications network, the second position to the remote application;

receives, from the remote application via the telecommunications network, another plurality of frames that correspond to a second viewing angle, wherein the second position is within the second viewing angle;

using the other plurality of frames that correspond to the second viewing angle, locally generates the updated XR rendering that corresponds to the second position within the second viewing angle; and communicates, via the local network, the updated XR rendering to the local device, wherein the local device provides the updated XR rendering to the user.

17. The system of claim 15, wherein the mobile edge device:

receives, via the local network, a third request from the local device for content, wherein the third request includes a third position captured by the sensor of the local device;

determines whether the third position is within the first viewing angle;

when the mobile edge device determines the third position is within the first viewing angle:

using the plurality of frames, locally generates another updated XR rendering that corresponds to the third position within the first viewing angle; and communicates, via the local network, the other updated XR rendering to the local device, wherein the local device provides the other updated XR rendering to the user.

18. The system of claim 15, wherein the first position and the second position each comprise data specifying a user position in six degrees of freedom within a three-dimensional space, and wherein the six degrees of freedom include one or more of a rotational movement or a translational movement.

19. The system of claim 18, wherein the XR rendering is generated using the portion of frames in the plurality of frames that correspond to the user position specified in the six degrees of freedom within the three-dimensional space for the first position.

20. The system of claim 18, wherein the updated XR rendering is generated using the other plurality of frames that correspond to the user position specified in the six degrees of freedom within the three-dimensional space for the second position.

* * * * *